US008799644B2

(12) United States Patent
Kaleedhass

(10) Patent No.: US 8,799,644 B2
(45) Date of Patent: Aug. 5, 2014

(54) SYSTEM AND METHOD OF PREVENTING THE TRANSMISSION OF KNOWN AND UNKNOWN ELECTRONIC CONTENT TO AND FROM SERVERS OR WORKSTATIONS CONNECTED TO A COMMON NETWORK

(75) Inventor: Kartik Kaleedhass, Kuala Lumpur (MY)

(73) Assignee: Karsof Systems LLC, Anaheim, CA (US)

( * ) Notice: Subject to any disclaimer, the term of this patent is extended or adjusted under 35 U.S.C. 154(b) by 1684 days.

(21) Appl. No.: 10/755,321

(22) Filed: Jan. 13, 2004

(65) Prior Publication Data

US 2004/0143764 A1    Jul. 22, 2004

(30) Foreign Application Priority Data

Jan. 13, 2003   (MY) ............................. PI 2003 0098

(51) Int. Cl.
*H04L 29/06* (2006.01)

(52) U.S. Cl.
USPC ............................. 713/154; 709/224; 709/206

(58) Field of Classification Search
None
See application file for complete search history.

(56) References Cited

U.S. PATENT DOCUMENTS

| 5,606,668 | A | * | 2/1997 | Shwed | 726/13 |
|---|---|---|---|---|---|
| 5,623,601 | A | * | 4/1997 | Vu | 726/12 |
| 5,832,208 | A | * | 11/1998 | Chen et al. | 726/24 |
| 5,848,418 | A | * | 12/1998 | de Souza et al. | 1/1 |
| 5,983,270 | A | * | 11/1999 | Abraham et al. | 709/224 |
| 5,987,611 | A | * | 11/1999 | Freund | 726/4 |
| 6,003,084 | A | * | 12/1999 | Green et al. | 709/227 |
| 6,012,083 | A | * | 1/2000 | Savitzky et al. | 709/202 |
| H001944 | H | * | 2/2001 | Cheswick et al. | |
| 6,212,558 | B1 | * | 4/2001 | Antur et al. | 709/221 |
| 6,243,815 | B1 | * | 6/2001 | Antur et al. | 726/11 |
| 6,330,610 | B1 | * | 12/2001 | Docter et al. | 709/229 |
| 6,415,329 | B1 | * | 7/2002 | Gelman et al. | 709/245 |
| 6,496,935 | B1 | * | 12/2002 | Fink et al. | 726/13 |
| 6,499,107 | B1 | * | 12/2002 | Gleichauf et al. | 726/23 |
| 6,519,646 | B1 | * | 2/2003 | Gupta et al. | 709/229 |
| 6,546,486 | B1 | * | 4/2003 | Perlman et al. | 713/153 |
| 6,574,666 | B1 | * | 6/2003 | Dutta et al. | 709/227 |
| 6,578,151 | B1 | * | 6/2003 | Nilsen | 726/11 |
| 6,584,508 | B1 | * | 6/2003 | Epstein et al. | 709/229 |
| 6,675,205 | B2 | * | 1/2004 | Meadway et al. | 709/219 |
| 6,728,885 | B1 | * | 4/2004 | Taylor et al. | 726/24 |
| 6,760,330 | B2 | * | 7/2004 | Tahan | 370/389 |
| 6,766,454 | B1 | * | 7/2004 | Riggins | 713/185 |
| 6,772,334 | B1 | * | 8/2004 | Glawitsch | 713/153 |
| 6,816,973 | B1 | * | 11/2004 | Gleichauf et al. | 726/13 |
| 6,826,694 | B1 | * | 11/2004 | Dutta et al. | 726/13 |

(Continued)

OTHER PUBLICATIONS

Multimedia Glory Sdn. Bhd. <http://web.archive.org/web/20020208041955/www.mglorysb.com/products.htm>, Feb. 8, 2002.*

(Continued)

*Primary Examiner* — Fikremariam A Yalew
(74) *Attorney, Agent, or Firm* — Maier & Maier, PLLC

(57) ABSTRACT

A system for preventing the transmission of known and unknown electronic contents to and from servers or workstations connected to a common network. The system includes devices for means for interpreting the contents of a messaging protocol or application network protocol, for checking compliance of the electronic contents with the messaging protocol specification or application network protocol specification and for filtering the electronic content based on its functions.

11 Claims, 5 Drawing Sheets

(56) References Cited

U.S. PATENT DOCUMENTS

| | | | | |
|---|---|---|---|---|
| 6,845,452 B1* | 1/2005 | Roddy et al. | | 726/11 |
| 6,871,227 B2* | 3/2005 | Allen | | 709/224 |
| 6,968,356 B1* | 11/2005 | Lakhdir | | 709/203 |
| 6,981,278 B1* | 12/2005 | Minnig et al. | | 726/12 |
| 7,043,644 B2* | 5/2006 | DeBruine | | 713/153 |
| 7,047,561 B1* | 5/2006 | Lee | | 726/12 |
| 7,093,008 B2* | 8/2006 | Agerholm et al. | | 709/223 |
| 7,103,799 B2* | 9/2006 | Dixon | | 714/18 |
| 7,111,163 B1* | 9/2006 | Haney | | 713/153 |
| 7,114,008 B2* | 9/2006 | Jungck et al. | | 709/246 |
| 7,143,144 B2* | 11/2006 | Kanai et al. | | 709/217 |
| 7,152,242 B2* | 12/2006 | Douglas | | 726/23 |
| 7,171,681 B1* | 1/2007 | Duncan et al. | | 726/11 |
| 7,185,361 B1* | 2/2007 | Ashoff et al. | | 726/4 |
| 7,200,684 B1* | 4/2007 | Schales et al. | | 709/252 |
| 7,216,225 B2* | 5/2007 | Haviv et al. | | 713/152 |
| 7,222,359 B2* | 5/2007 | Freund et al. | | 726/3 |
| 7,313,822 B2* | 12/2007 | Ben-Itzhak | | 726/24 |
| 7,543,056 B2* | 6/2009 | McClure et al. | | 709/224 |
| 7,668,944 B2* | 2/2010 | Leib et al. | | 709/222 |
| 2002/0010800 A1* | 1/2002 | Riley et al. | | 709/249 |
| 2002/0022971 A1* | 2/2002 | Tanaka et al. | | 705/1 |
| 2002/0059517 A1* | 5/2002 | Haviv et al. | | 713/154 |
| 2002/0065908 A1* | 5/2002 | Agerholm et al. | | 709/223 |
| 2002/0065938 A1* | 5/2002 | Jungck et al. | | 709/246 |
| 2002/0091801 A1* | 7/2002 | Lewin et al. | | 709/219 |
| 2002/0099829 A1* | 7/2002 | Richards et al. | | 709/227 |
| 2002/0103998 A1* | 8/2002 | DeBruine | | 713/153 |
| 2002/0138437 A1* | 9/2002 | Lewin et al. | | 705/51 |
| 2002/0157023 A1* | 10/2002 | Callahan et al. | | 713/201 |
| 2003/0009689 A1* | 1/2003 | Kolb | | 713/201 |
| 2003/0051155 A1* | 3/2003 | Martin | | 713/201 |
| 2003/0065944 A1* | 4/2003 | Mao et al. | | 713/201 |
| 2003/0088680 A1* | 5/2003 | Nachenberg et al. | | 709/229 |
| 2003/0110262 A1* | 6/2003 | Hasan et al. | | 709/226 |
| 2003/0115328 A1* | 6/2003 | Salminen et al. | | 709/225 |
| 2003/0115458 A1* | 6/2003 | Song | | 713/165 |
| 2003/0140253 A1* | 7/2003 | Crosbie et al. | | 713/201 |
| 2003/0154399 A1* | 8/2003 | Zuk et al. | | 713/201 |
| 2003/0167405 A1* | 9/2003 | Freund et al. | | 713/201 |
| 2004/0010712 A1* | 1/2004 | Hui et al. | | 713/201 |
| 2004/0019690 A1* | 1/2004 | Cardno et al. | | 709/230 |
| 2004/0042490 A1* | 3/2004 | Henderson et al. | | 370/469 |
| 2004/0049693 A1* | 3/2004 | Douglas | | 713/200 |
| 2004/0054927 A1* | 3/2004 | Leppanen et al. | | 713/201 |
| 2004/0083388 A1* | 4/2004 | Nguyen | | 713/201 |
| 2004/0088409 A1* | 5/2004 | Braemer et al. | | 709/225 |
| 2004/0088423 A1* | 5/2004 | Miller et al. | | 709/229 |
| 2004/0088719 A1* | 5/2004 | Gazdik et al. | | 719/330 |
| 2004/0103318 A1* | 5/2004 | Miller et al. | | 713/201 |
| 2004/0109518 A1* | 6/2004 | Miller et al. | | 375/356 |
| 2004/0131059 A1* | 7/2004 | Ayyakad et al. | | 370/389 |
| 2004/0136386 A1* | 7/2004 | Miller et al. | | 370/401 |
| 2004/0177271 A1* | 9/2004 | Arnold et al. | | 713/201 |
| 2004/0237098 A1* | 11/2004 | Watson et al. | | 725/25 |
| 2005/0193429 A1* | 9/2005 | Demopoulos et al. | | 726/23 |

OTHER PUBLICATIONS

Christoph L. Schuba et al., "A Reference Model for Firewall Technology," IEEE published document part of Proceedings of the 13th Annual Computer Science Applications Conference (ACSAC '97), Dec. 8-12, 1997, San Diego, CA.

Alain Mayer et al., "Fang: a Firewall Analysis Engine," IEEE published document part of 2000 IEEE Sympthium on Security and Privacy (S&P 2000), May 14-17, 2000, Berkeley, California.

* cited by examiner

SYSTEM AND METHOD OF PREVENTING THE TRANSMISSION OF KNOWN AND UNKNOWN ELECTRONIC CONTENT TO AND FROM SERVERS OR WORKSTATIONS CONNECTED TO A COMMON NETWORK

This Non-provisional application claims priority under 35 U.S.C. §119(a) on Patent Application No(s). PI 2003 0098 filed in Malaysia on Jan. 13, 2003, the entire contents of which are hereby incorporated by reference.

FIELD OF THE INVENTION

The present invention generally relates to a method of preventing unauthorized access to Servers or Workstations connected to a common network medium such as the Internet. More specifically, the invention relates to a configuration of systems and methods for intercepting and removing undesirable content such as computer viruses from and to a common network.

DESCRIPTION OF BACKGROUND ART

The Internet, sometimes called simply "the Net," is a worldwide system of computer networks—a network of networks in which users at any one computer can, if they have permission, get information from any other computer (and sometimes talk directly to users at other computers). It was conceived by the Advanced Research Projects Agency (ARPA) of the U.S. government in 1969 and was first known as the ARPANET. The original aim was to create a network that would allow users of a research computer at one university to be able to "talk to" research computers at other universities. A side benefit of ARPANET's design was that, because messages could be routed or rerouted in more than one direction, the network could continue to function even if parts of it were destroyed in the event of a military attack or other disaster.

Today, the Internet is a public, cooperative, and self-sustaining facility accessible to hundreds of millions of people worldwide. Physically, the Internet uses a portion of the total resources of the currently existing public telecommunication networks. Technically, what distinguishes the Internet is its use of a set of protocols called TCP/IP (for Transmission Control Protocol/Internet Protocol). Two recent adaptations of Internet technology, the intranet and the extranet, also make use of the TCP/IP protocol.

For many Internet users, electronic mail (e-mail) has practically replaced the Postal Service for short written transactions. Electronic mail is the most widely used application on the Net. You can also carry on live "conversations" with other computer users, using Internet Relay Chat (IRC). More recently, Internet telephony hardware and software allows real-time voice conversations.

The most widely used part of the Internet is the World Wide Web (often abbreviated "WWW" or called "the Web"). Its outstanding feature is hypertext, a method of instant cross-referencing. In most Web sites, certain words or phrases appear in text of a different color than the rest; often this text is also underlined. When you select one of these words or phrases, you will be transferred to the site or page that is relevant to this word or phrase. Sometimes there are buttons, images, or portions of images that are "clickable." If you move the pointer over a spot on a Web site and the pointer changes into a hand, this indicates that you can click and be transferred to another site.

Using the Web, you have access to millions of pages of information. Web browsing is done with a Web browser, the most popular of which are Microsoft Internet Explorer and Netscape Navigator. The appearance of a particular Web site may vary slightly depending on the browser you use. Also, later versions of a particular browser are able to render more "bells and whistles" such as animation, virtual reality, sound, and music files, than earlier versions.

Today, the Internet being a public, cooperative, and self-sustaining facility accessible to hundreds of millions of people worldwide, the security of the Internet is most important and systems like firewalls are used for security as shown in FIG. 4.

A firewall is a set of related programs, located at a network gateway server, that protects the resources of a private network from users from other networks. (The term also implies the security policy that is used with the programs.) An enterprise with an intranet that allows its workers access to the wider Internet installs a firewall to prevent outsiders from accessing its own private data resources and for controlling what outside resources its own users have access to.

Basically, a firewall, working closely with a router (a logical device that routes the network information across networks, for example, routing network packets from private network to internet) program, examines each network packet to determine whether to forward it toward its destination. A firewall also includes or works with a proxy server that makes network requests on behalf of workstation users. A firewall is often installed in a specially designated computer separate from the rest of the network so that no incoming request can get directly at private network resources.

There are a number of firewall screening methods. A simple one is to screen requests to make sure they come from acceptable (previously identified) domain name and Internet Protocol addresses. For mobile users, firewalls allow remote access into the private network by the use of secure logon procedures and authentication certificates.

However the function of the firewall is limited in providing security at the operating system level only. At the Operating System level, the TCP/IP network protocol is monitored and filtered by the firewall. But various applications, for example, a Web Browser uses HTTP application protocol on top of TCP/IP network protocol to communicate with a Web Server. With TCP/IP being a transparent protocol, the firewall, since it filters at the Operating System level, will not be aware of HTTP protocol and will not check the contents represented in HTTP protocol and will authorize it immediately without checking.

U.S. Pat. No. 6,499,107, has disclosed a method of identifying and stopping subsequent attacks based on attack signature left after the first attack. The method does not prevent the attacks in the first place, but based on a signature left, identifies them and prevents subsequent attacks. There is a need for a method that prevents the attacks in the first place itself.

U.S. Pat. No. 6,496,935, has disclosed a method of accelerating the process of firewall filtering, but the filtering is carried out only at the operating system level, such as dealing with TCP/IP only. It does not filter the contents at the application level. There is a need for a method that does the filtering of application level protocols such as but not limited to HTTP at the application level.

Published U.S. patent application No. 20030009689, has disclosed a method of relaying the message protocol from a network node inside a firewall protected network to the network outside the firewall by traversing the messaging protocol. The traversing is carried out to enable two-way communication between the network node inside the firewall and with the outside, which otherwise is difficult. But the method does not do the verification of contents of the messaging protocol for compliance, leaving room for the attacks to the application environment. There is a need for a method for interpreting the complete contents of the messaging protocol or the application network protocol and checking for its compliance with the protocol specification at IETF, thus preventing attacks to the application environment.

Examples of published documents that disclose technologies that deals only the operating system level verification but do not do application level packet filtering are:
  i) IEEE published document part of 13th Annual Computer Security Applications Conference (ACSAC '97), Dec. 8-12, 1997, San Diego, Calif., Title: A reference model for firewall technology Internet URL: http://computer-.org/proceedings/acsac/8274/82740133abs.htm;
  ii) IEEE published document part of 2000 IEEE Symposium on Security and Privacy (S&P 2000), May 14-17, 2000, Berkeley, Calif., p. 0177 Fang: A Firewall Analysis Engine, Title: A Firewall Analysis Engine, Internet URL: http://computer.org/proceedings/sp/0665/06650177abs.htm;
  iii) U.S. Pat. No. 5,832,208 discloses an anti-virus agent for use with databases and mail servers that principally detects and removes computer viruses located in attachments to e-mail messages. It does not prevent unknown viruses from attacking the systems in the network.

Such limitations are often used as an advantage by attackers to attack the servers by exploiting the flaws in various implementations of the Internet application protocol such as but not limited to HTTP (HyperText Transfer Protcol), FTP (File Transfer Program), SSH (Secure SHell), HTTPS (Secure-HyperText Transfer Protocol). The implementations of the application network protocol are done at the application level leaving all the application vulnerable to attacks.

The attacks include tasks such as but not limited to stealing private information, trade secrets and other important information with the computers in the private network or in the home.

SUMMARY OF THE INVENTION

To provide security for the communications between the applications, a new method of filtering is used in the invention. The method includes processing and interpreting of application network protocols used by the application across the network. It also prevents any information from reaching the application if it does not comply with the protocol specification.

The invention acts a proxy receiving information from the server, interpreting and verifying, then sending information to the client application like web browser and vise versa as shown in FIG. 5.

The invention uses the protocol specification available at Internet Engineering Task Force (IETF)—www.ietf.org. The organization has various RFC (Request For Comments) documents forming basis of various protocol implementations. Most implementations follow these specifications for compatibility reasons.

The protocol for which the invention provides security is as follows:
  i) HTTP (HyperText Transfer Protocols);
  ii) FTP (File Transfer Protocol);
  iii) SSH (Secure SHell);
  and other commonly used protocols.

Each and every protocol has guidelines defined by IETF and is used by the invention for compliance.

The invention also includes functions such as filtering based on content by preventing the unauthorized code from execution.

The invention will maintain a list of content that needs to be filtered and will automatically quarantine them. The list of "to be filtered content" can be maintained manually or can be automatically updated from the centralized server.

The contents can also be filtered based on the functions of the content such as modification of files, deleting of files and also creation of files. The functions are normally identified by the presence of a call to the operating system for the actions and scanning through each and every instruction in the content automatically identifies them.

In the invention the filtering is carried out by scanning through each and every network packet sent or received by the workstation or the server. The network packet is the minimal unit in the information transfer over the Internet.

The invention discloses a system for preventing the transmission of known and unknown electronic contents to and from servers or workstations connected to a common network comprising a means for interpreting contents of a messaging protocol or application network protocol; a means for checking compliance of the electronic contents with the messaging protocol specification or application network protocol specification; and a means for filtering the electronic content based on its functions. The system further includes a means for preventing attacks on the servers and/or workstations without knowing details of the attack. The means for interpreting contents of the messaging protocol or application network protocol comprises one or more servers, one or more workstations or combination thereof and intermediate verifier with protocol specification maintain therein. The means for interpreting contents of a messaging protocol or application network protocol comprises one or more workstations and intermediate verifier with protocol specification maintain therein. The means for interpreting contents of a messaging protocol or application network protocol comprises one or more servers and intermediate verifier with protocol specification maintain therein.

The means for checking compliance of the electronic contents with the messaging protocol specification or application network protocol specification comprises one or more servers, one or more workstations or a combination thereof and an intermediate verifier with protocol specification maintained therein and wherein the one or more servers, the one or more workstations and the combination thereof and the intermediate verifier being the same as the one or more servers, the one or more workstations or combination thereof and the intermediate verifier stated earlier or are separately independent. The intermediate verifier checks compliance of the electronic contents between one or more servers or one or more workstations or combination thereof. The means for the filtering of the electronic content based on its function comprises a network of one or more servers and one or more workstations or combination thereof and at least one intermediate verifier functioning as a filter. The workstation is selected from one or more of the following Personal digital assistant (PDA); Personal computers; Mobile cellular telephone; or any apparatus with computing capability connected to a network.

The known and unknown electronic content is identified by one or more of the following pattern of binary codes within the electronic contents: Name of the electronic content such as name of file; Orientation and format of the electronic content such as plain text file, image file or data files; Function of the electronic content such as but not limited to erasure files without users knowledge or instruction, automatic sharing of files and corruption of files. A system wherein the patterns, names and orientation and format are used for filtering known content and the functions are used for filtering the unknown content. The unknown content, once identified to have a damaging function, has its name, pattern and orientation and format identified and stored in the database for further or future filtering. The identification and storage is done automatically.

The invention further discloses a method of preventing the transmission of known or unknown electronic content to and from servers or workstations or combination thereof connected to a common network comprising sending response information from one or more servers or one or more workstations or combination thereof to a designated recipient; verifying the response information by intermediate verifier before the information reaches the designated recipient; relaying the verified information to the designated recipient and wherein the method of verifying includes the filtering of the known or unknown electronic content is based on its functions, patterns, names and orientation and formats of the electronic contents.

In another aspect the method of preventing the transmission of known or unknown electronic contents to and from servers or workstations or combination thereof connected to a common network comprises verifying of requested information by an intermediate verifier before information reaches a designated server or workstation or combination thereof wherein the method of verifying includes dispatching the verified information to a designated recipient and receiving request information by one or more servers or one or more workstations or combination thereof from one or more servers or one or more workstations. The method of verifying the information includes one or more of the following steps: checking the presence of known patterns in the electronic contents; checking the presence of known name of electronic contents such as name of file; checking orientation and format of the electronic contents such as plain text file, image file or data file; checking function of the electronic content such as but not limited to erasure files without users knowledge or instructions, automatic sharing of files and corruption of files. Yet in another aspect the method of preventing the transmission of known or unknown electronic contents to and from servers or workstations or combination thereof connected to a common network comprises sending response information from one or more server or one or more workstation or combination thereof to a designated recipient; verifying the response information by an intermediate verifier before information reaches the designated recipient; relaying the verified information to the designated recipient and wherein the method of verifying includes the interpretation of the messaging network protocol or application network protocol and checking its compliance with the application/network protocol specification available at IETF by the intermediate verifier programmed with such capabilities.

In another aspect the method of preventing the transmission of known or unknown electronic content to and from servers of workstations or combination thereof connected to a common network comprises verifying requested information by an intermediate verifier before information reaches the designated server or workstation or combination thereof; dispatching of verified information to a designated recipient and receiving requested information by one or more servers or one or more workstations or combination thereof from one or more servers or one or more workstations wherein the method of verifying includes the interpretation of the messaging network protocol or application network protocol and checking its compliance with the application/network protocol specification available at IETF by the intermediate verifier programmed with such capabilities.

The invention further discloses a computer readable medium for verification for known or unknown electronic content transmitted between one or more servers or one or more workstations or combination thereof comprising program instructions for verifying the electronic content by checking the presence of known patterns in the electronic contents; checking the presence of known name of electronic contents such as name of file; checking orientation and format of the electronic contents such as plain text file, image file or data file; checking function of the electronic content such as but not limited to erasure files without users knowledge or instructions, automatic sharing of files and corruption of files and/or program instructions for checking it compliance with the application/network protocol specification available at the IETF programmed with such capabilities.

The program instructions are distributable through a common network such as the internet local area network or wide area network and are installed and/or executable in any computing device. The computer readable medium includes one or more CD roms, DVD, magnetic tapes, backup media or any media which is capable of storing computer program instructions. The media is connected to one or more servers, one or more workstations or combination thereof.

These and other aspects and advantages of the present invention will become apparent upon study of the following detailed descriptions and the accompanying diagram.

BRIEF DESCRIPTION OF DRAWINGS

The invention together with further advantages thereof, may be best understood by reference to the following description of preferred embodiments taken in conjunction with the accompanying drawings in which.

DETAILED DESCRIPTION OF THE PREFERRED EMBODIMENTS

In this description the term, 'common network' would include the Internet, Intranet, wide area network and other common networks.

Figure 1:
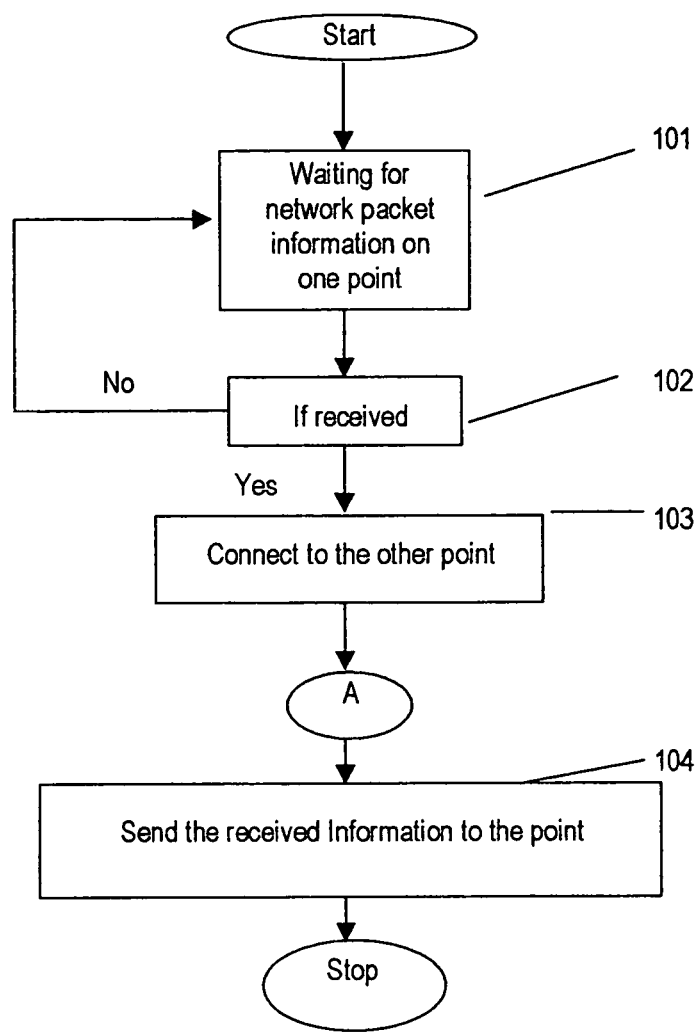
FIG. 1 is a flow diagram of the process of proxying between the application server and application client and vice versa without any verification.

FIG. 1 is a flow diagram of the process of proxying between the application server and application client and vice versa without any verification. This is the process that takes place without any verification of information when configured to do so. The decision to not verify the contents is either done manually by the administrator or automatically by the system. The manual configuration is done in the facilities provided to administrators and is mainly used when the two network points are trusted and the information transferred between them is also trusted. The network point is either a Server serving information to the client or the Client receiving information from the Server.

The Server usually has an application program, also called "server programs" or "application server programs", that has instructions to send the information to the clients that connect to it and communicate based on the network protocol specification. An example of the server program could be a HTTP Server or Web Server. The client referred to herein is also the "application program" or "client program" that receives information from the server and optionally displays it to the user. An example of the client program could be a Web Browser.

In this process the invention acts as a proxy between the client and the server and relaying information between them. The information is referred to here as the "network packets." The network point or the point refers to the connection to a server or the client. The process starts with the waiting for information on a network point in step 101. This point could be a server or the client that sends the information.

The "waiting" referred to here can be a timed wait, that is, waiting for a specific number of seconds then checking for the information receipt, or event driven, that is, being notified by the Operating System on the information receipt. The waiting is indefinite unless interrupted by the users such as the people operating the personal computer and the receipt of the information is checked in the step 102. If the information is not yet received, the process immediately continues at step 101.

But if the information is received, the process continues from step 103. In step 103, the program (part of the invention) connects to the other point as defined by the sending network point or a predefined location. The information about the other network point could be an IP address, a dot notation of the network computer location or DNS (Domain Naming System) name that will have to be mapped with an IP address or any other known computer location identification patterns. Upon connecting to the other point in the step 103, the process continues at step 104 where the information received at step 102 is sent to the other network point. After step 104, the process terminates.

Figure 2:
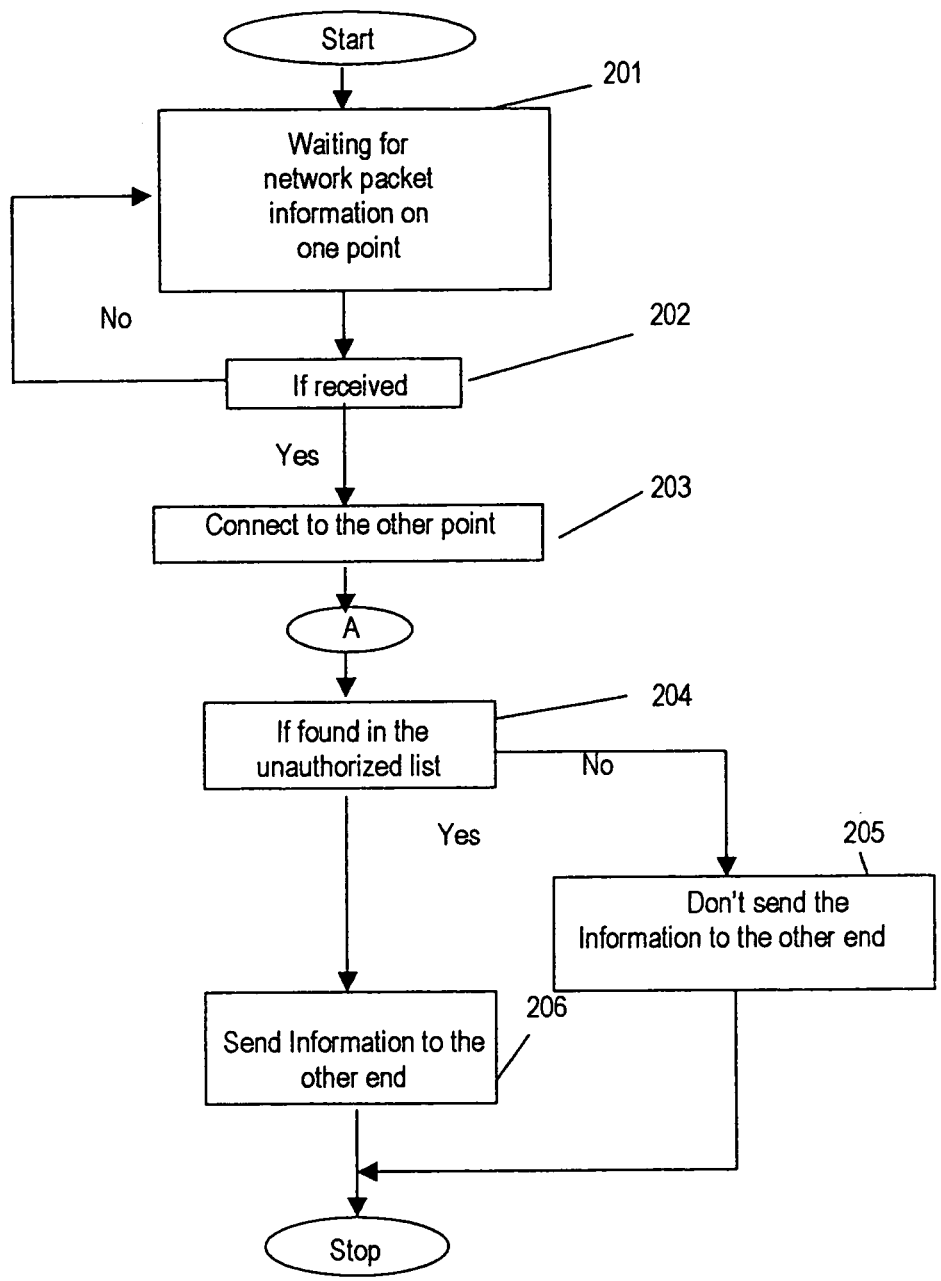
FIG. 2 is a flow diagram of the process of filtering the unauthorized content.

FIG. 2 is a flow diagram of the process of filtering the unauthorized content. This is the process that verifies information in the network packet before being sent to the other end. To accomplish this a list of unauthorized content will be maintained in the database. The database will have predefined list of the criteria of the unauthorized content and actions that the content is restricted to. The criterion in the database includes but not limited to the:

i) pattern—The patterns are a list of binary codes (zeroes and ones) grouped and are identified from the known damaging programs. These include programs that may spread viruses and may damage the files present in the personal computer.

ii) name—The name are a list of program names that are known to have damaging functions such as (but not limited to) erasing the information stored in the personal computer. The list may also contain sub-strings matching, parts of the full name given to the content.

iii) its orientation and format—This list contains the formats and the orientation of the content with damaging functions such as (but not limited to) erasing the information stored in the personal computer. The list also includes the formats of the unauthorized/restricted data.

iv) functions—This list contains the functions that are identified to be damaging such as (but not limited to) erasing files without user's instructions, automatically sharing important files, corrupting the files in the personal computer by scrambling them to a state from which the file cannot be retrieved to its original state.

The database will be maintained correctly and all necessary actions will be taken by the invention to keep the list with the latest information. The actions include but are not limited to automatically updating information from a centralized repository and by automatically notifying the administrator about the availability of an update, if the update has to be done manually.

The functions are used for filtering unknown content whereas patterns, names and format are used for filtering known content. The unknown electronic content are identified by its functions and their patterns, names, format are automatically added to the database for further/future filtering.

The network point is either a Server serving information to the client or the Client receiving information from the Server. The Server usually has an application program, also called "server programs" or "application server programs", that has instructions to send the information to the clients that connect to it and communicate based on the network protocol specification. An example of the server program could be a HTTP Server or Web Server.

The client referred to herein is also the "application program" or "client program" that receives information from the server and optionally displays it to the user. An example of the client program could be a Web Browser. In this process the invention acts as a filtering mechanism between the client and the server and also relays only the authorized information between them. The information is referred to here as the "network packets."

The network point or the point refers to the connection to a server or the client, such as one or more workstations, one or more servers or any combination thereof. The process starts with the waiting for information on a network point in step 201. This point could be a server or the client that sends the information.

The "waiting" referred here can be a timed wait, that is, waiting for a specific number of seconds then checking for the information receipt, or event driven, that is, being notified by the Operating System on the information receipt.

The waiting is indefinite unless interrupted by the users such as the people operating the personal computer and the receipt of the information is checked in step 202. If the information is not yet received, the process immediately continues at step 201. But if the information is received, the process continues from step 203. In step 203, the program (part of the invention) connects to the other point as defined by the sending network point or a predefined location.

The information about the other network point could be an IP address, a dot notation of the network computer location or a DNS (Domain Naming System) name that will have to be mapped with an IP address or any other known computer location identification patterns. Upon connecting to the other point in step 203, the process continues at step 204 where the information received at step 202 is checked with the list of unauthorized content. The list will include patterns, name, orientation and formats and functions. If the content matches with any of the criterion in lists, in step 205, the information will be blocked without sending to the other point. But if the content is authorized with its criteria not in the predefined lists, the information will be automatically sent to the other end in step 206 and the process terminates normally.

Figure 3:
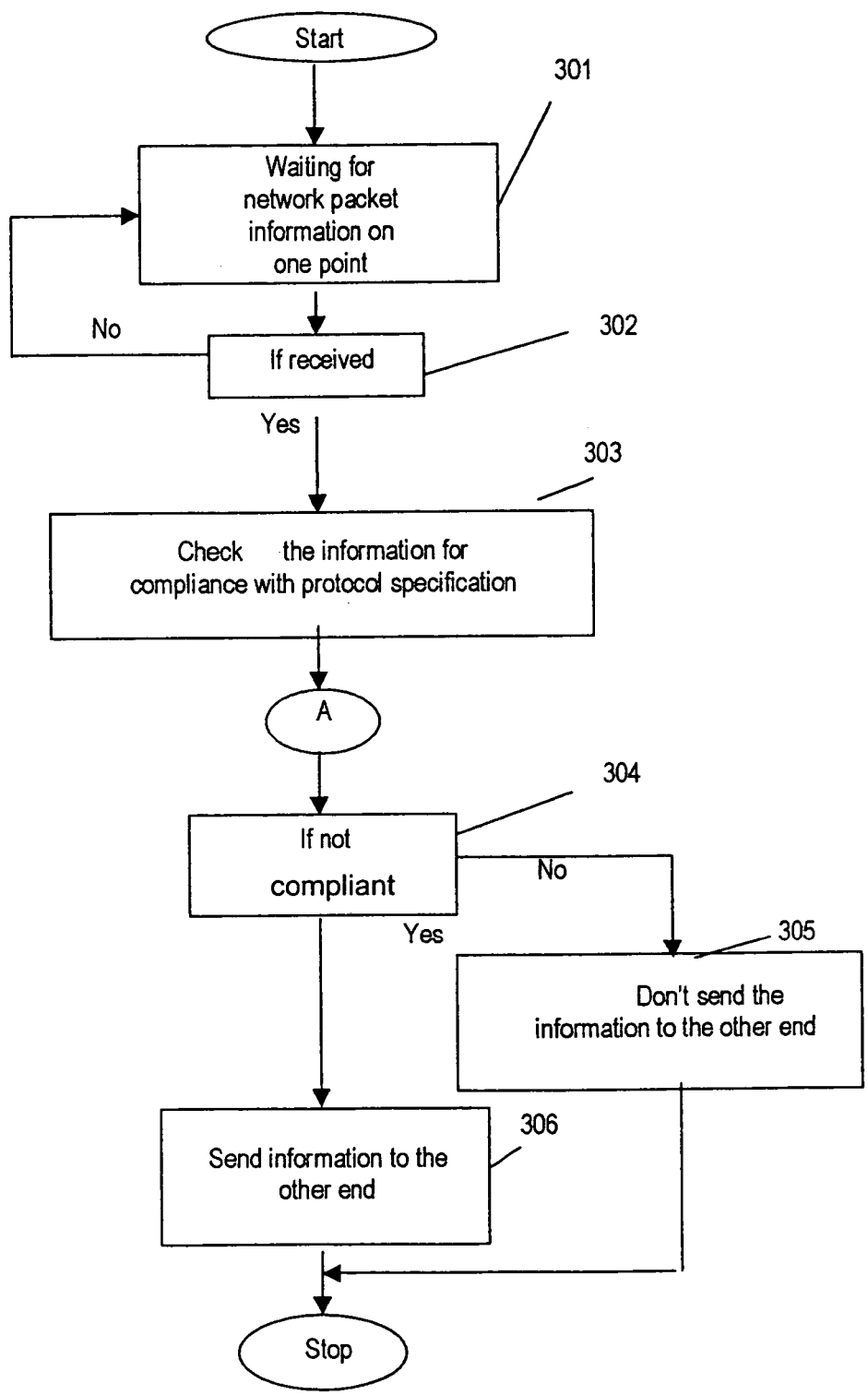
FIG. 3 is a flow diagram of the process of filtering of the application network protocols.
Figure 4:
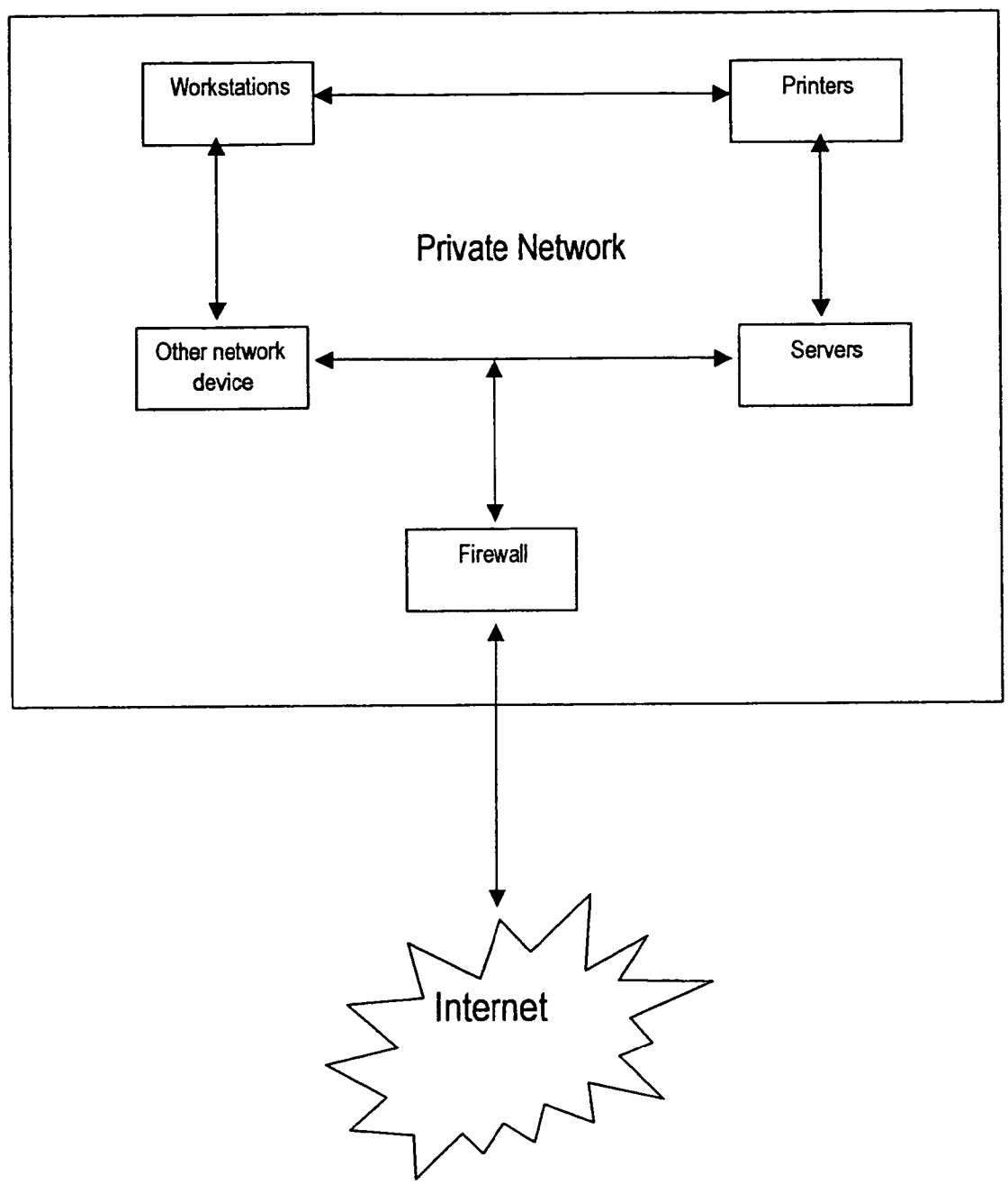
FIG. 4 illustrates a prior art example of a network configuration incorporating a firewall.
Figure 5:
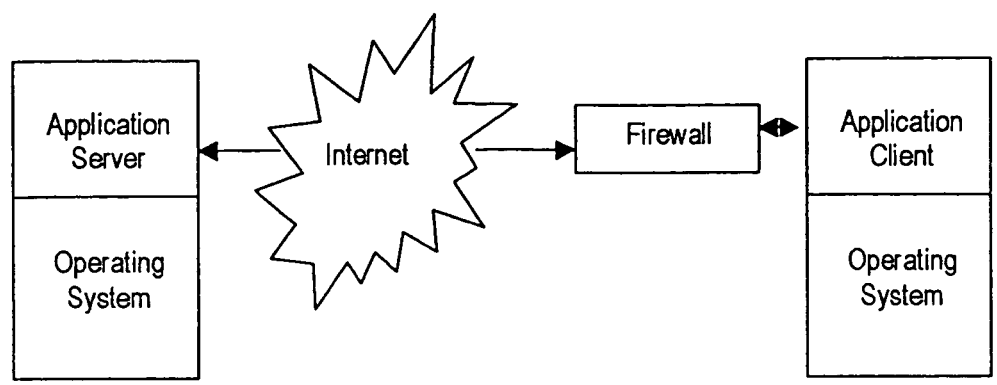
FIG. 5 illustrates a network configuration incorporating a firewall between the internet and applicant client/operating system.

FIG. 3 is a flow diagram of the process of filtering the application network protocol. This is, the process that verifies content in a communication between the application server and application client by checking compliance with the protocol specification as defined by IETF. For each and every application network protocol the contents will be checked for compliance with the exact protocol specification, that is, if the application uses HTTP 1.0 (HyperText Transfer Protocol) as their communication protocol, this process will check the communication contents with RFC 1945 defined by IETF. To accomplish this, the identification of the protocol used is carried out and is done by mapping the protocol with the port numbers used. A port number is a way to identify a specific process to which an Internet or other network message is to be forwarded when it arrives at a server. For the Transmission Control Protocol and the User Datagram Protocol (commonly used subsystem of TCP/IP network protocol), a port number is a 16-bit integer that is put in the header appended to a message unit. This port number is passed logically between client and server transport layers and physically between the transport layer and the Internet Protocol layer and forwarded on.

For example, a request from a client to a server on the Internet may request a file be served from that host's File Transfer Protocol (FTP) server or process. In order to pass your request to the FTP process in the remote server, the Transmission Control Protocol (TCP) software layer in your computer identifies the port number of 21 (which by convention is associated with an FTP request) in the 16-bit port number integer that is appended to your request. At the server, the TCP layer will read the port number of 21 and forward your request to the FTP program at the server. Some services or processes have conventionally assigned permanent port numbers. These are known as well-known port numbers. In other cases, a port number is assigned temporarily (for the duration of the request and its completion) from a range of assigned port numbers. This is called an ephemeral port number.

From the assigned port numbers, the protocol that is being used is identified and the communication is checked with the respective specification defined by IETF. The network point is either a Server serving information to the client or the Client receiving information from the Server. The Server usually has an application program, also called "server programs" or "application server programs", that has instructions to send the information to the clients that connect to it and communicate based on the network protocol specification. An example of the server program could be a HTTP Server or Web Server The client referred to herein is also the "application program" or "client program" that receives information from the server and optionally displays it to the user. An example of the client program could be a Web Browser. In this process the invention acts as a protocol filtering mechanism between the client and the server and also relays only the authorized information between them. The information is referred to as the "network packets." The network point or the point refers to the connection to a server or the client. The process starts with the waiting for information on a network point in step 301. This point could be a server or the client that sends the information.

The "waiting" referred here can be a timed wait, that is, waiting for a specific number of seconds then checking for the information receipt, or event driven, that is, being notified by the Operating System on the information receipt. The waiting is indefinite unless interrupted by the users such as the people operating the personal computer and the receipt of the information is checked in step 302. If the information is not yet received, the process immediately continues at step 301. But if the information is received, the process continues from step 303. In step 303, the program (part of the invention) connects to the other point as defined by the sending network point or a predefined location.

The information about the other network point could be an IP address, a dot notation of the network computer location or a DNS (Domain Naming System) name that will have to be mapped with an IP address or any other known computer location identification patterns. Upon connecting to the other point in the step 303, the process continues at step 304 where the information received at step 302 is checked for compliance with the specification defined by IETF for the protocol being used. If content does not comply with the specification, in step 305, the information will be blocked without sending to the other point. The compliance to the specification is verified by checking the Format of the data as required by the IETF specification; Process flow as required by the IETF specification. But if the content complies with the specification the information will be automatically sent to the other end in step 306 and the process terminates normally.

Further, although the foregoing invention has been described in some detail for purposes of clarity of understanding, it will be apparent that certain changes, modifications, adaptations may be practiced within the scope of the claims. The described embodiments, the flow diagrams and architecture of the system should be taken as illustrative and not restrictive. The invention should not be limited to the details or parameters given herein, but should be defined by the following claims.

The invention claimed is:

1. A system for preventing the transmission of known and unknown electronic contents to and from servers or workstations connected to a common network comprising:
   means for interpreting contents of a messaging protocol or application network protocol, including at least HyperText Transfer Protocol, File Transfer Protocol, and Secure Shell;
   means for checking compliance of the electronic contents with the messaging protocol specification and Internet Engineering Task Force application network protocol specification by an intermediate verifier including protocol specification therein;
   means for filtering known or unknown electronic content based upon a function of the electronic content identified by a call to an operating system for actions of at least one of file sharing, file modification, file deletion and file creation; and
   wherein the means for checking compliance of the electronic contents with the messaging protocol specification or application network protocol specification comprises at least one server, at least one workstation or combinations thereof and an intermediate verifier with protocol specification maintained therein and wherein the at least one server, the at least one workstation and the combinations thereof and the intermediate verifier are the same as the at least one server, at least one workstation or combinations thereof and an intermediate verifier in said means for interpreting contents of a messaging protocol or application network protocol, or are separately independent,
   wherein the known and unknown electronic content is identified by one or more of the following pattern of binary codes within the electronic contents: name of the electronic content; orientation and format of the electronic content including plain text file, image file or data files, and function of the electronic content.

2. A system as claimed in claim 1, further comprising means for preventing attacks on the servers and workstations without knowing details of the attack.

3. A system as claimed in claim 1, wherein the means for interpreting contents of the messaging protocol or application network protocol comprises at least one server, at least one work station or combinations thereof and an intermediate verifier with protocol specification maintained therein.

4. A system as claimed in claim 1, wherein the means for interpreting contents of a messaging protocol or application network protocol comprises at least one workstation and intermediate verifier with protocol specification maintained therein.

5. A system as claimed in claim 1, wherein the means for interpreting contents of a messaging protocol or application network protocol comprises at least one server and an intermediate verifier with protocol specification maintain therein.

6. A system as claimed in claim 1, wherein the intermediate verifier checks compliance of the electronic contents between at least one server or at least one workstation or combinations thereof.

7. A system as claimed in claim 1, wherein the means for filtering the electronic content based on its function comprises a network of at least one server and at least one workstation or combinations thereof and at least one intermediate verifier functioning as a filter.

8. A system as claimed in claim 1, wherein the workstation is selected from at least one of the following:

Personal digital assistant (PDA);

Personal computers;

Mobile cellular telephone; or any apparatus with computing capability connected to a network.

9. A system as claimed in claim 1, wherein the patterns, names and orientation and format are used for filtering known content and the functions are used for filtering the unknown content.

10. A system as claimed in claim 1, wherein the unknown content once identified to have a damaging function within its name, pattern and orientation and format will be identified and stored in the database for further or future filtering.

11. A system as claimed in claim 10, wherein the identification and storage is done automatically.

* * * * *